United States Patent
Yamakawa et al.

(10) Patent No.: US 12,539,987 B2
(45) Date of Patent: Feb. 3, 2026

(54) AIRPORT FOR VERTICAL TAKE-OFF AND LANDING AIRCRAFT

(71) Applicant: Hitachi, Ltd., Tokyo (JP)

(72) Inventors: Hironobu Yamakawa, Tokyo (JP); Takahiro Ito, Tokyo (JP); Mikio Bando, Tokyo (JP); Nobuyasu Kanekawa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 18/931,533

(22) Filed: Oct. 30, 2024

(65) Prior Publication Data
US 2025/0187761 A1   Jun. 12, 2025

(30) Foreign Application Priority Data

Dec. 12, 2023   (JP) .................. 2023-209617

(51) Int. Cl.
  *B64U 70/90*   (2023.01)
  *E01F 7/02*    (2006.01)

(52) U.S. Cl.
  CPC .............. *B64U 70/90* (2023.01); *E01F 7/025* (2013.01)

(58) Field of Classification Search
  CPC .................. B64U 70/90; E01F 7/025
  See application file for complete search history.

(56) References Cited

U.S. PATENT DOCUMENTS

| | | | | |
|---|---|---|---|---|
| 2,193,062 A | * | 3/1940 | De Land | A01G 13/23 47/22.1 |
| 3,218,035 A | * | 11/1965 | Dunlap | E01F 7/02 403/345 |
| 4,549,724 A | * | 10/1985 | Taillandier | E01F 8/0041 256/12.5 |
| 7,690,629 B1 | * | 4/2010 | Briggs | E04H 17/168 256/65.12 |
| 7,780,148 B2 | * | 8/2010 | Kirby | E01F 7/02 256/12.5 |
| 10,988,949 B2 | * | 4/2021 | Puchner | E04G 21/3233 |
| 12,032,388 B2 | * | 7/2024 | Villiers | G08G 5/74 |
| 12,078,912 B2 | * | 9/2024 | Valio | G03B 15/03 |
| 2003/0111292 A1 | * | 6/2003 | Hess | B64F 1/26 181/205 |
| 2015/0167262 A1 | * | 6/2015 | Gartner | E01F 7/02 256/12.5 |
| 2016/0259333 A1 | * | 9/2016 | Ducharme | B64U 70/95 |
| 2017/0248948 A1 | * | 8/2017 | Otani | H04N 23/685 |
| 2019/0127083 A1 | * | 5/2019 | Di Benedetto | B64D 47/06 |
| 2019/0383052 A1 | * | 12/2019 | Blake | E04H 6/44 |
| 2020/0207485 A1 | * | 7/2020 | Foggia | B64U 70/90 |
| 2021/0070468 A1 | * | 3/2021 | Svirsky | B64U 80/25 |
| 2021/0276735 A1 | * | 9/2021 | Raptopoulos | A47G 29/141 |
| 2021/0284356 A1 | * | 9/2021 | Jourdan | B64F 1/18 |

(Continued)

FOREIGN PATENT DOCUMENTS

JP   2020-186523 A   11/2020

*Primary Examiner* — Medhat Badawi
(74) *Attorney, Agent, or Firm* — MATTINGLY & MALUR, PC

(57) ABSTRACT

An airport for a vertical take-off and landing aircraft includes three or more windbreak walls that extend radially about a reference axis, and three or more take-off and landing areas for the vertical take-off and landing aircrafts, which are partitioned by two adjacent windbreak walls among the three or more windbreak walls.

10 Claims, 6 Drawing Sheets

(56) References Cited

U.S. PATENT DOCUMENTS

| | | | |
|---|---|---|---|
| 2022/0267026 A1* | 8/2022 | Lee | B64F 1/007 |
| 2022/0349134 A1* | 11/2022 | Marques Lito Velez Grilo | |
| | | | B64F 1/26 |
| 2023/0303272 A1* | 9/2023 | Passley | B64U 70/00 |
| 2024/0391616 A1* | 11/2024 | Dayan | B64U 70/90 |
| 2025/0011017 A1* | 1/2025 | Kim | B64U 80/25 |
| 2025/0108935 A1* | 4/2025 | Johnson | B60L 53/22 |
| 2025/0187761 A1* | 6/2025 | Yamakawa | B64U 70/90 |

* cited by examiner

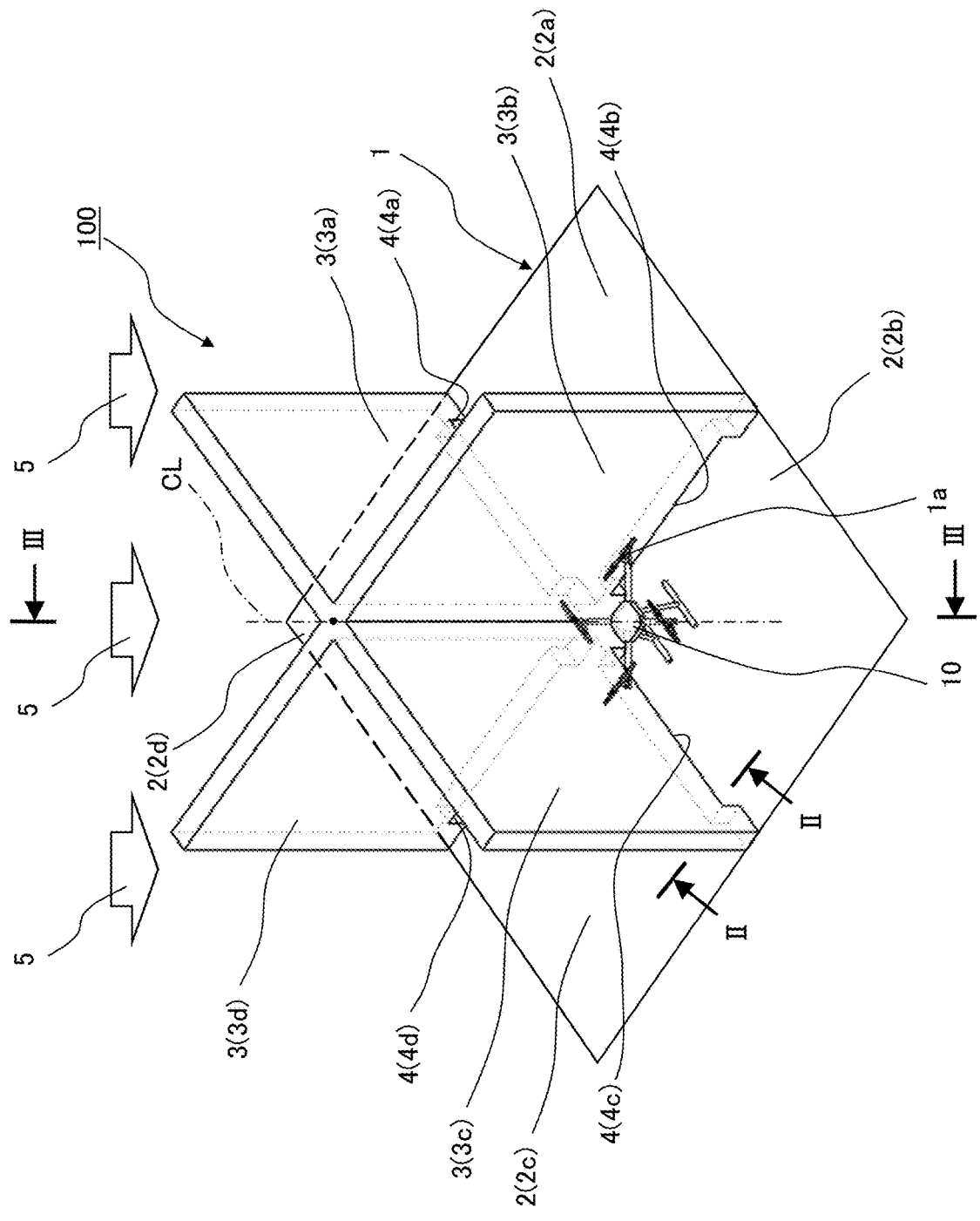
[FIG. 1]

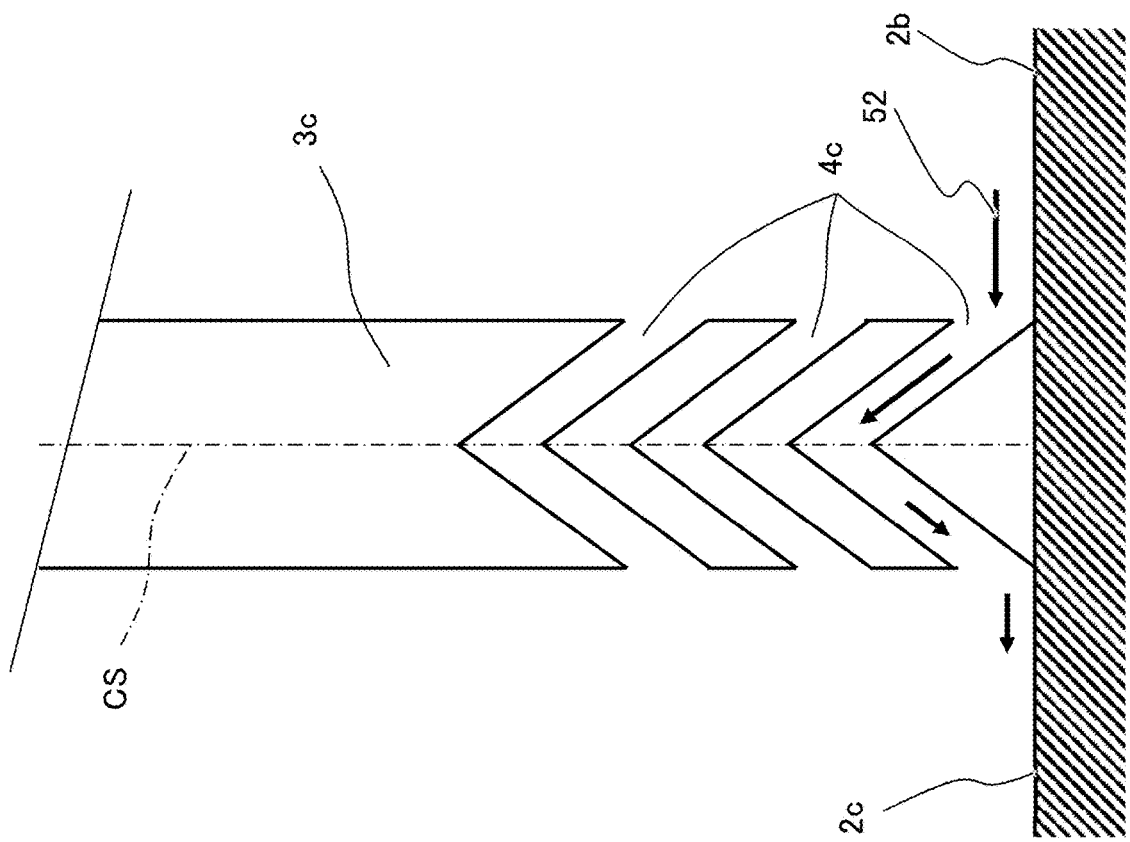
[FIG. 2]

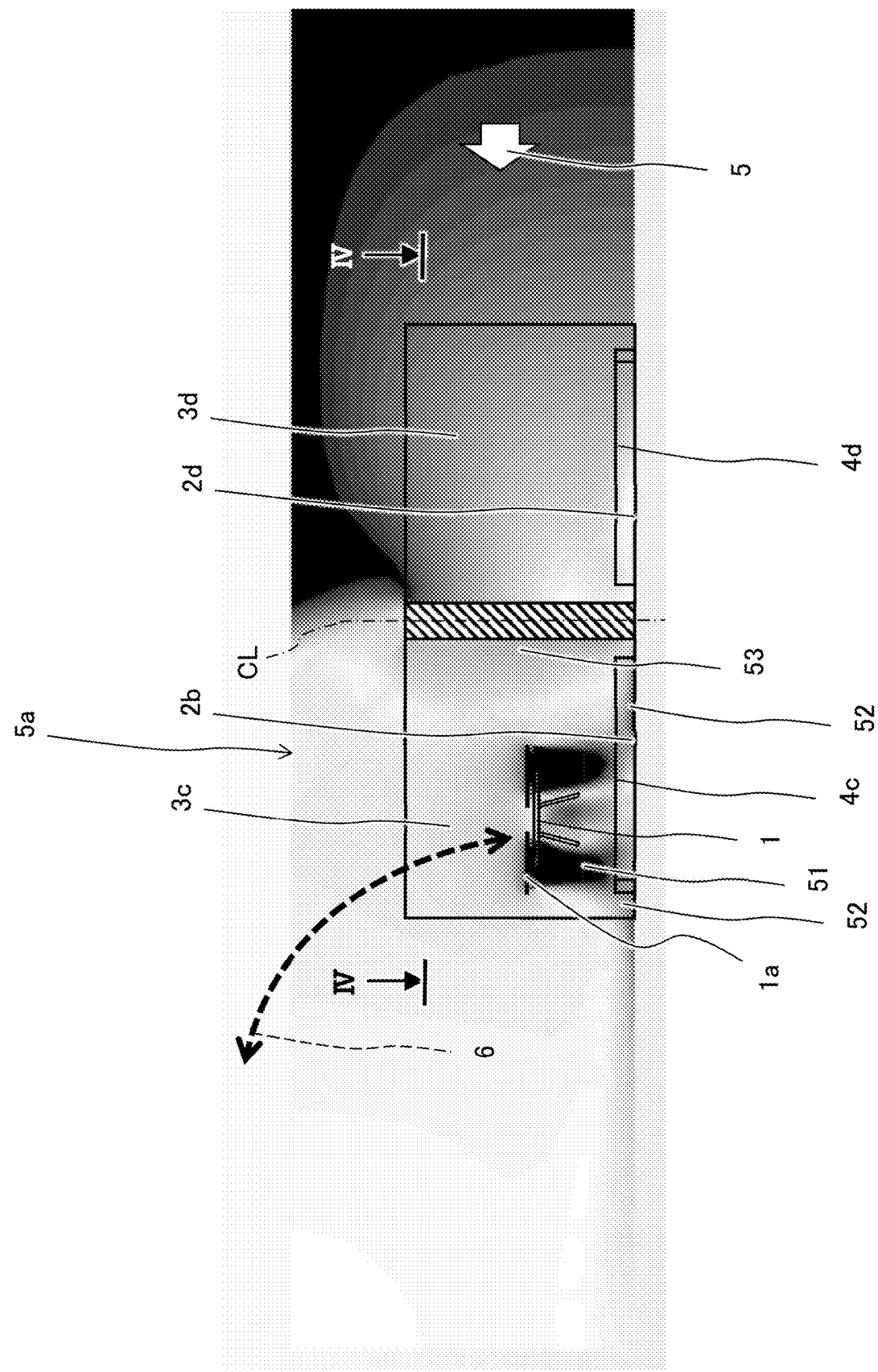
[FIG. 3]

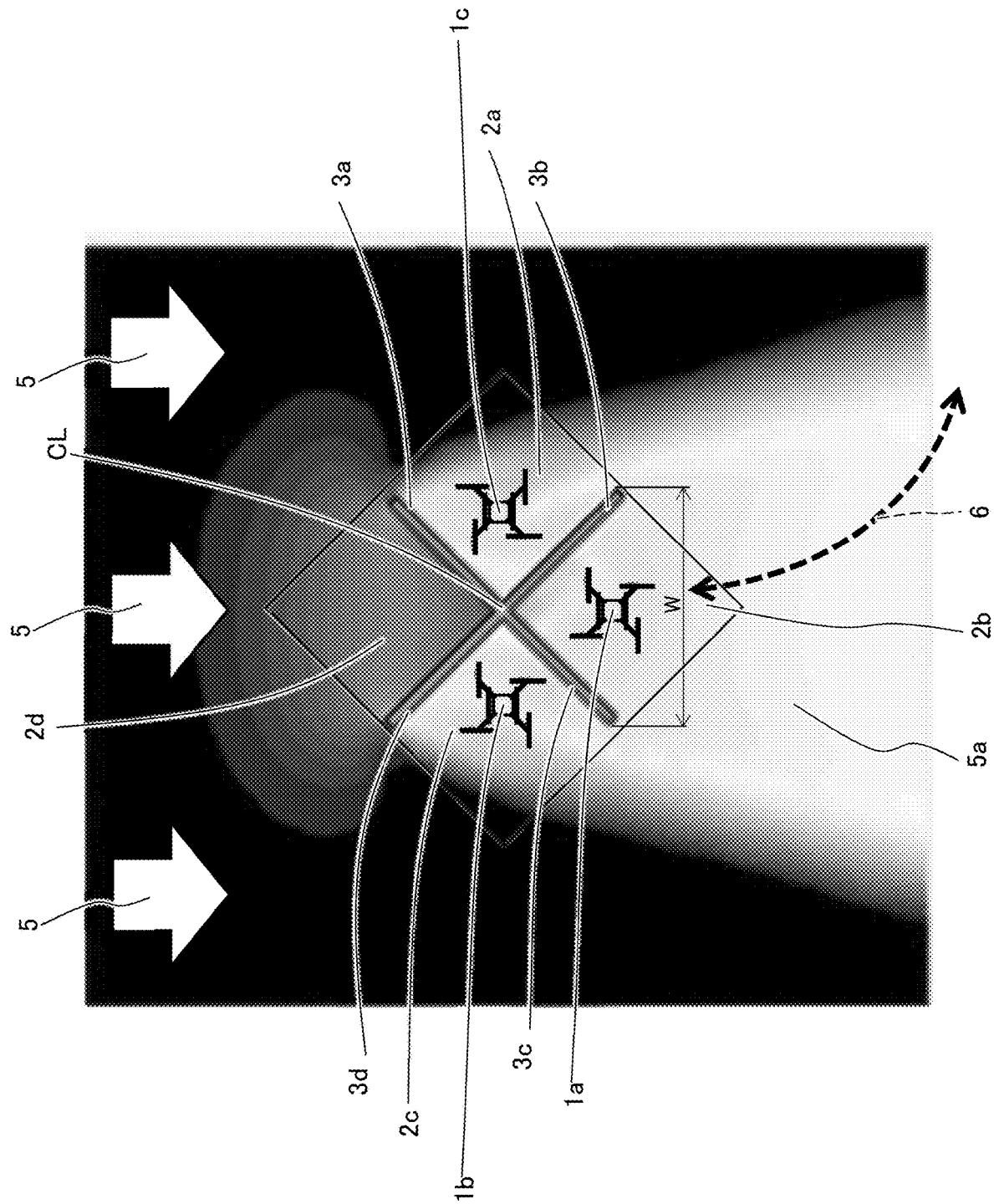
[FIG. 4]

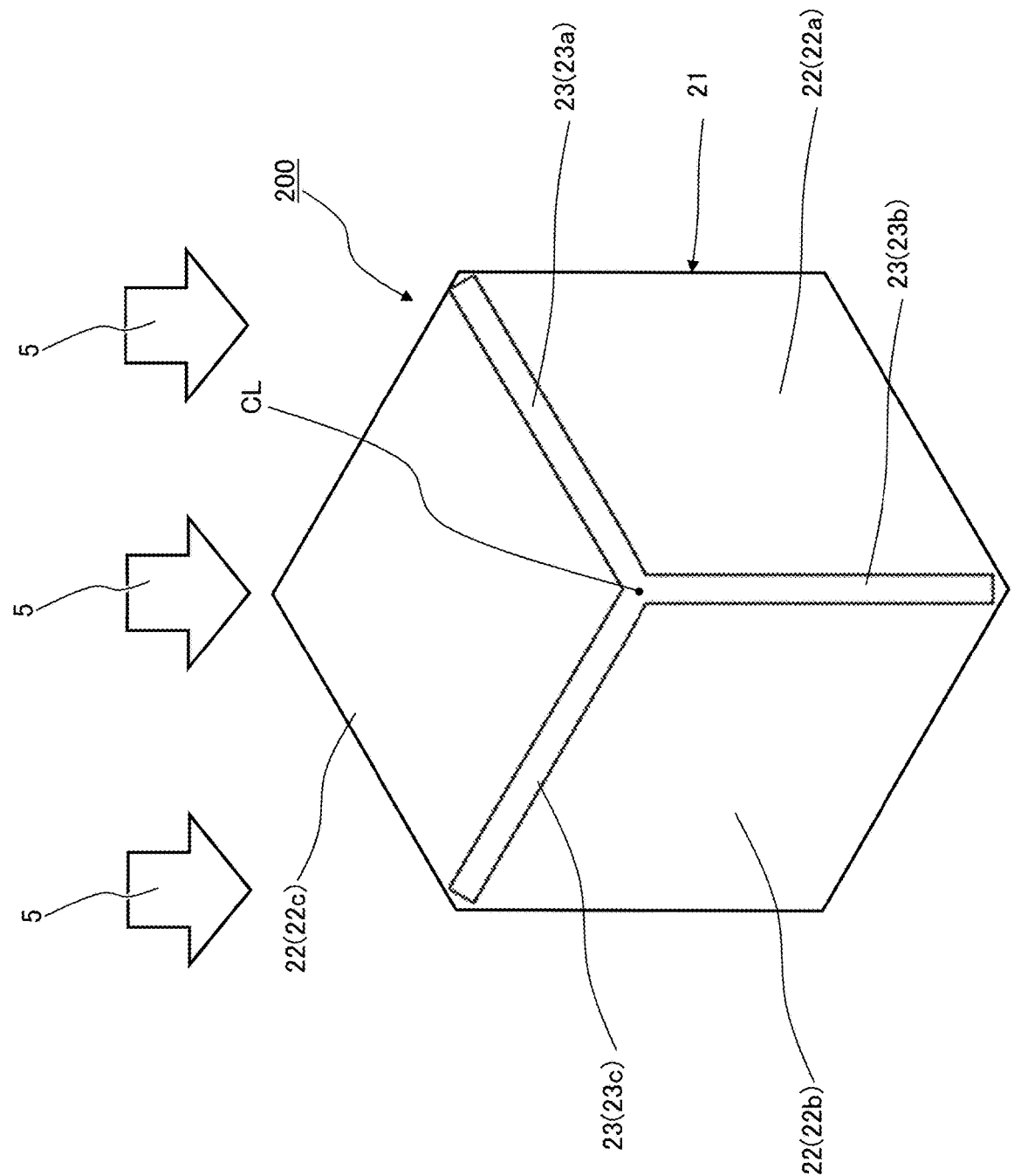
[FIG. 5]

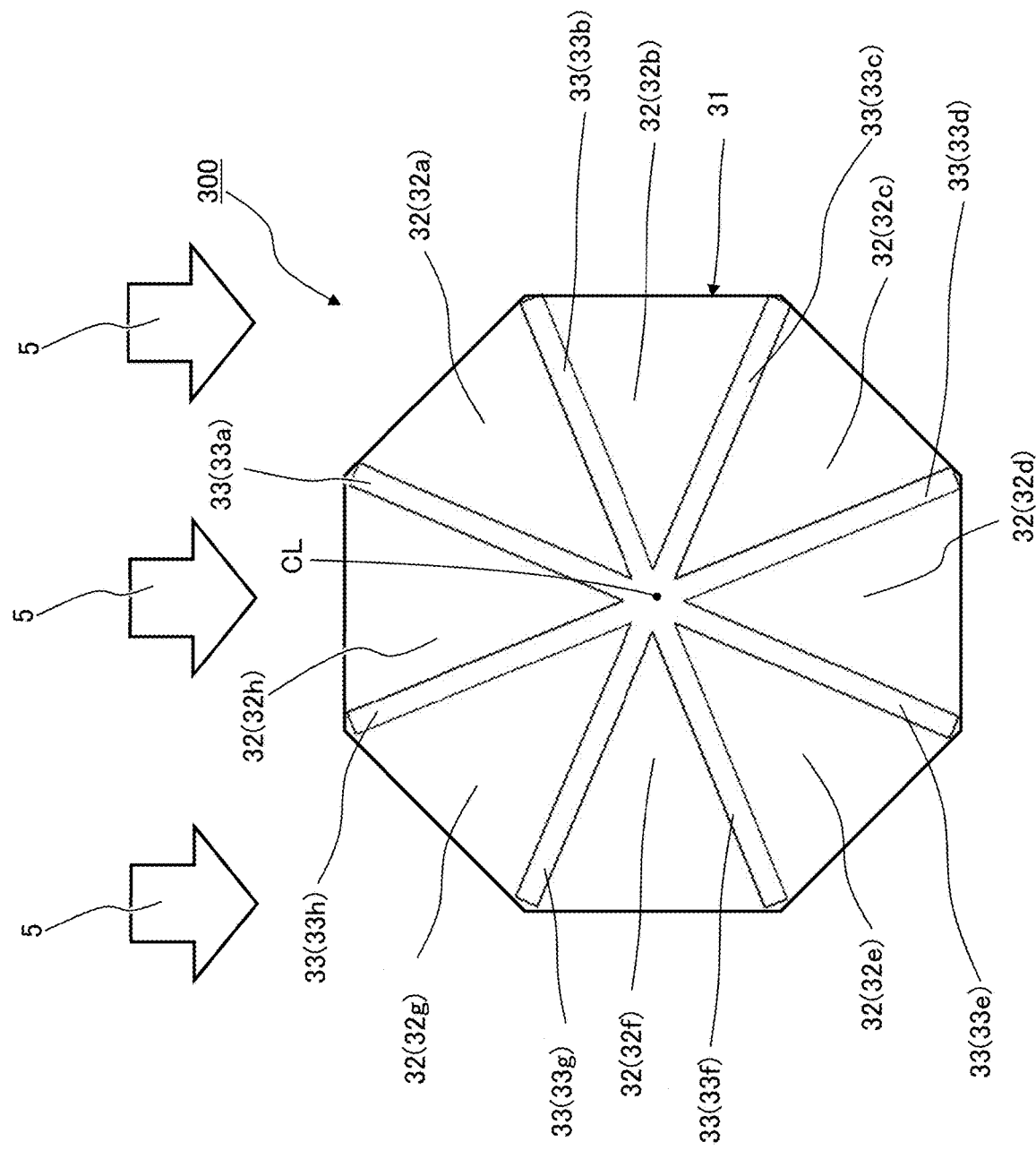
[FIG. 6]

AIRPORT FOR VERTICAL TAKE-OFF AND LANDING AIRCRAFT

CROSS-REFERENCE TO RELATED APPLICATION

The present application claims priority from Japanese application JP2023-209617, filed on Dec. 12, 2023, the content of which is hereby incorporated by reference into this application.

BACKGROUND OF THE INVENTION

1. Field of the Invention

The present invention relates to an airport for a vertical take-off and landing aircraft.

2. Description of the Related Art

In recent years, expectations for social implementation of a vertical take-off and landing aircraft, which is an aircraft that is called a drone or an aerial vehicle and is capable of vertical take-off and landing, are increasing. For example, an electric vertical take-off and landing aircraft (eVTOL) vertically takes off and land at a take-off and landing site by a propulsion device using a plurality of propeller fans (rotary wings) that rotationally drive by a motor called a multi-rotor.

As an airport for this type of vertical take-off and landing aircraft, JP 2020-186523 A discloses a landing place of a vertical take-off and landing aircraft, in which fence portions (walls) are installed on four sides of a take-off and landing point of a vertical take-off and landing aircraft in order to reduce the influence of a cross wind at the time of take-off and landing of the vertical take-off and landing aircraft (multicopter) and to make the vertical take-off and landing aircraft take off and land more safely.

SUMMARY OF THE INVENTION

In a case where four walls surround four sides of a landing point of a vertical take-off and landing aircraft as in the landing place in JP 2020-186523 A, a cross wind does not flow in the vicinity of the wall located on the windward side among the four walls, but a cross wind exceeding the wall may flow down and flow into a position away from the wall. Furthermore, the cross wind flowing into the landing place hits another wall located on the leeward side facing the wall and is reversed to form an additional secondary flow, or the like, and may rather form a complicated vortex in the landing place. The wind flow generated by the leeward wall in this manner may destabilize the posture of the aircraft at the time of take-off and landing.

An object of the present invention is to provide an airport for a vertical take-off and landing aircraft, which is capable of suppressing a wind flow that destabilizes a posture of the vertical take-off and landing aircraft at time of take-off and landing.

The present application includes a plurality of means for solving the above problem, and an example thereof is an airport for a vertical take-off and landing aircraft. The airport includes three or more windbreak walls that extend radially about a reference axis, and three or more take-off and landing areas for a vertical take-off and landing aircraft, which are partitioned by two adjacent windbreak walls among the three or more windbreak walls.

According to the present invention, it is possible to suppress a wind flow that destabilizes a posture of a vertical take-off and landing aircraft at time of take-off and landing, such as a secondary flow or a vortex generated by the wind that exceeds the windbreak wall hitting another wall, the wind being discharged from a portion without the wall even if the wind exceeding the windbreak wall enters a take-off and landing area, without surrounding an area where the vertical take-off and landing aircraft takes off and lands from four sides by the wall. In particular, the vicinity of a coupling portion of three or more windbreak walls formed around the reference axis has difficulty in entering of wind and has a high windbreak effect, and thus is suitable for taking off and landing. Objects, configurations, and advantageous effects other than those described above will be clarified by the descriptions of the following embodiments.

BRIEF DESCRIPTION OF THE DRAWINGS

FIG. 1 is a schematic perspective view of an airport for a vertical take-off and landing aircraft according to a first embodiment of the present invention;

FIG. 2 is a schematic view of a II-II cross section of FIG. 1;

FIG. 3 is an analysis diagram obtained by analyzing distribution of a wind speed in a III-III cross section of FIG. 1;

FIG. 4 is an analysis diagram obtained by analyzing the distribution of the wind speed in view of arrows IV-IV in FIG. 3;

FIG. 5 is a schematic plan view of an airport for a vertical take-off and landing aircraft according to a second embodiment of the present invention; and FIG. 6 is a schematic plan view of an airport for a vertical take-off and landing aircraft according to a third embodiment of the present invention.

DESCRIPTION OF THE PREFERRED EMBODIMENTS

Hereinafter, a configuration and an operation of an airport for a vertical take-off and landing aircraft according to first to third embodiments of the present invention will be described with reference to the drawings. In the drawings, the same reference signs indicate the same parts.

First Embodiment

FIG. 1 is a schematic perspective view of an airport 100 for a vertical take-off and landing aircraft according to a first embodiment of the present invention.

The airport 100 for a vertical take-off and landing aircraft is a take-off and landing place for taking off and landing a vertical take-off and landing aircraft (may be simply referred to as an aircraft) 10, and includes a take-off and landing place 1 and a windbreak wall 3 as illustrated in FIG. 1.

The vertical take-off and landing aircraft (VTOL Aircraft) 10 is an aircraft capable of vertically taking off and landing, and is preferably an electric vertical take-off and landing aircraft (eVTOL). The vertical take-off and landing aircraft 10 is useful particularly in space-constrained environments such as cities because it does not require a long runway as in a normal airplane and can take off and land in a limited space.

The take-off and landing place 1 is a substantially flat section for the vertical take-off and landing aircraft 10 to take off and land, and is preferably provided in a place easily accessible to residents around the city, for example, a parking lot or a rooftop of a convenience store.

Since the vertical take-off and landing aircraft 10 exerts high thrust and applies a large load to the ground, at the time of take-off and landing, it is necessary for the surface of the take-off and landing place 1 to have sufficient load resistance. The vertical take-off and landing aircraft 10 is relatively smaller than a general aircraft, and the size thereof varies depending on the type (for example, a drone or a flying car). Therefore, the take-off and landing place 1 needs to have an appropriate size suitable for the size of the vertical take-off and landing aircraft 10. Furthermore, it is preferable that noise and safety measures are taken in the take-off and landing place 1, and facilities necessary for the operation of the airframe are preferably prepared, such as a fuel supply facility (a charging facility in the case of an electric vertical take-off and landing aircraft), a maintenance facility, and an air traffic control facility.

The windbreak wall 3 is a facility for blocking an air flow (wind) 5 in the horizontal direction crossing the take-off and landing place 1 and causing the vertical take-off and landing aircraft 10 that takes off and lands at the take-off and landing place 1 to take off and land more safely and stably. The airport 100 for a vertical take-off and landing aircraft includes three or more windbreak walls 3 (in the present embodiment, four windbreak walls 3a to 3d) that extend radially about a reference axis CL.

For example, it is preferable that the windbreak wall 3 is a rectangular flat plate that stands upright with respect to the take-off and landing place 1, is formed of, for example, an aluminum alloy, and has sufficient strength against the air flow 5.

In addition, the height, the width, and the thickness of the windbreak wall 3 are not particularly limited. For example, the height, the width, and the thickness are preferably 5 to 10 times, 2 to 7 times, and 0.2 to 2 times, respectively, with respect to the rotor diameter of the vertical take-off and landing aircraft 10 that is mainly parked. However, in a strong wind area, in order to ensure safety, it is preferable that the height, the width, and the thickness of the windbreak wall 3 are all larger than those exemplified above.

In the airport 100 for a vertical take-off and landing aircraft in the present embodiment, the four windbreak walls 3a to 3d extend in four directions around the reference axis CL, and have a cross shape in plan view.

Each of the three or more windbreak walls 3 may be coupled at the reference axis CL, or may be coupled to a columnar body provided at the position of the reference axis CL, for example, a quadrangular prism, a cylindrical column, or a cylinder. Furthermore, it is preferable that the lower end of each of the three or more windbreak walls 3 is grounded and fixed to the take-off and landing place 1. As a result, the windbreak wall 3 has sufficient strength against the air flow 5.

The airport 100 for a vertical take-off and landing aircraft includes three or more take-off and landing areas 2 (in the present embodiment, four take-off and landing areas 2a to 2d) for the vertical take-off and landing aircraft 10, which are partitioned by two adjacent windbreak walls 3 among three or more windbreak walls 3 that extend radially about the reference axis CL.

It is assumed that, as illustrated in FIG. 1, in the airport 100 for a vertical take-off and landing aircraft, the air flow 5 in the horizontal direction flows from the take-off and landing area 2d side toward the take-off and landing area 2b side. It is assumed that the air flow 5 is a cross wind flowing through the airport 100 for a vertical take-off and landing aircraft and is equal to or less than a cross wind limit value (for example, a typical aircraft crosswind limit of 20 knots (approximately 37 kilometers per hour)). The cross wind limit value varies depending on the model of the vertical take-off and landing aircraft 10. In a case where the air flow 5 is larger than the cross wind limit value, taking off and landing of the vertical take-off and landing aircraft 10 in the airport 100 for the vertical take-off and landing aircraft may be prohibited.

It is preferable that at least one area (at least one area of the take-off and landing areas 2a to 2c in FIG. 1) of the remaining areas excluding an area located on a windward side of the reference axis CL (the take-off and landing area 2d in FIG. 1) among all the take-off and landing areas 2 is used for take-off and landing of the vertical take-off and landing aircraft 10. At least one area of the remaining areas excluding the area located most windward among all the take-off and landing areas 2 may be used for take-off and landing.

Furthermore, a plurality of remaining areas (at least two of the take-off and landing areas 2a to 2c in FIG. 1) excluding an area located on the windward side of the reference axis CL (the take-off and landing area 2d in FIG. 1) among all the take-off and landing areas 2 may be used for take-off and landing of the vertical take-off and landing aircraft 10.

An area located most leeward (the take-off and landing area 2b in FIG. 1) among all the take-off and landing areas 2 may be used for take-off and landing of the vertical take-off and landing aircraft 10.

In the airport 100 for a vertical take-off and landing aircraft according to the present embodiment, the remaining take-off and landing areas 2a to 2c excluding the take-off and landing area 2d located on the windward side of the reference axis CL with respect to the air flow 5 or the take-off and landing area 2b located most leeward among four take-off and landing areas 2a to 2d may be used for take-off and landing of the vertical take-off and landing aircraft 10.

It is preferable that a slit 4 that causes two adjacent take-off and landing areas 2 to communicate with each other is provided at a lower portion of one windbreak wall 3 that partitions the two adjacent take-off and landing areas 2 among all the windbreak walls 3. The slit 4 may be provided in all the windbreak walls 3. The slit 4 can be, for example, an elongated opening provided at a central portion of the lower end of the windbreak wall 3. The slit 4 forms a gap through which the air flow passes between the lower end of each of the windbreak walls 3 and the take-off and landing place 1.

FIG. 2 is a schematic cross-sectional view of a slit 4c having a different shape from the slit 4 illustrated in FIG. 1. A cross section of this cross-sectional view is indicated as a II-II cross section in FIG. 1. As illustrated in this drawing, it is preferable that the slit 4c has a symmetrical shape with respect to a center plane CS of the windbreak wall 3c that partitions the two adjacent take-off and landing areas 2b and 2c.

For example, the shape of the slit 4c in the cross section (II-II cross section) perpendicular to the center plane CS of the windbreak wall 33c is preferably an inverted V-shape as illustrated in FIG. 2.

As a result, a ground air flow 52 that flows along the take-off and landing surface of the take-off and landing area 2b generated by a downwash 51 (see FIG. 3), which is an air flow flowing from a rotor 1a of the vertical take-off and landing aircraft 10 toward the take-off and landing surface of the take-off and landing area 2b, and flows to the take-off and landing area 2c through the slit 4c is changed in direction in the slit 4c, and the wind force is weakened.

Preferably, the airport 100 for the vertical take-off and landing aircraft is provided with a control device (not illustrated) that performs air traffic control. As the control device, for example, a computer including a processor, a memory, and the like can be used.

The control device collects data including the wind speed and the wind direction in the airport 100 for the vertical take-off and landing aircraft from a weather observation device (for example, an anemometer) provided in the airport 100 for the vertical take-off and landing aircraft, weather data on the Internet, and the like. Then, the control device preferably determines, based on the collected data, an area located on the windward side of the reference axis CL among the three or more take-off and landing areas 2, a remaining area excluding an area located on the windward side of the reference axis CL, and an area located most leeward.

For example, the control device can determine the take-off and landing area 2d located on the windward side of the reference axis CL among the four take-off and landing areas 2a to 2d, the remaining take-off and landing areas 2a to 2c excluding the area located on the windward side of the reference axis CL, and the take-off and landing area 2b located most leeward.

The control device is preferably provided with a communication device for wirelessly communicating with the aircraft 10. The control device instructs, by the communication device, for example, an operator who operates the vertical take-off and landing aircraft 10 by a remote control, a mobile device, or the like in the case of a small vertical take-off and landing aircraft 10 (for example, a drone), and instructs a pilot on board in the case of a relatively large vertical take-off and landing aircraft 10 (for example, a flying car).

For example, the control device first issues an instruction to land in an area located most leeward (the take-off and landing area 2b in FIG. 1) in the take-off and landing area 2. In a case where it is not possible to use the area located most leeward, the control device issues an instruction to land on the remaining take-off and landing areas 2a and 2c excluding the area located most leeward (the take-off and landing area 2b in FIG. 1) and the area located on the windward side of the reference axis CL (the take-off and landing area 2d in FIG. 1).

The determination of the take-off and landing area 2 used by the aircraft 10 for take-off and landing may be performed by a related person such as a pilot or a control officer of each aircraft 10 based on wind direction information of the airport 100 for the vertical take-off and landing aircraft or the periphery thereof, in accordance with the above-described rules. Then, it is assumed that the take-off and landing of each aircraft 10 is performed in accordance with the determination.

The windbreak wall 3 may extend radially about the reference axis CL along the azimuth so that each take-off and landing area 2 can be designated by the azimuth. As a result, the control device can call each of the take-off and landing areas 2 by the azimuth. For example, if four windbreak walls 3 are provided along each of the northeast, the southeast, the southwest, and the northwest, the four take-off and landing areas 2 formed by the four windbreak walls 3 are located in any of the north, the south, the east, and the west. In addition, if eight windbreak walls 3 are provided along each of the north-northeast, the east-northeast, the east-southeast, the south-southeast, the south-southwest, the west-southwest, the west-northwest, and the north-northwest, the eight take-off and landing areas 2 formed by the eight windbreak walls 3 are located in any of the north, the northeast, the east, the southeast, the south, the southwest, the west, and the northwest.

Effects

The airport 100 for a vertical take-off and landing aircraft in the present embodiment includes three or more windbreak walls 3 that extend radially about the reference axis CL and three or more take-off and landing areas 2 for the vertical take-off and landing aircraft 10, which are partitioned by two adjacent windbreak walls 3 among the three or more windbreak walls 3.

In the airport 100 for the vertical take-off and landing aircraft, which is configured as described above, at least one of the remaining take-off and landing areas 2 excluding the area located on the windward side of the reference axis CL among all the take-off and landing areas 2 is used for take-off and landing of the vertical take-off and landing aircraft 10. The at least one take-off and landing area 2 used for take-off and landing is a substantially fan-shaped area partitioned by the two windbreak walls 3, but a radially outer portion of the area with respect to the reference axis CL is open (that is, the windbreak wall 3 does not exist). Therefore, even if the wind exceeding the windbreak wall 3 enters the take-off and landing area, the wind is discharged from the opened portion. That is, the secondary flow and the vortex generated when the wind exceeding the windbreak wall 3 hits other walls are less likely to be generated, and, according to the present embodiment, it is possible to stabilize the posture of the vertical take-off and landing aircraft 10 at the time of take-off and landing.

In addition, a coupling portion where the three or more windbreak walls 3 are coupled is formed around the reference axis CL which is the center of the three or more windbreak walls 3. As described above, in the vicinity of the coupling portion in the take-off and landing area 2 used for take-off and landing, the distance between the two adjacent windbreak walls 3 is short, and the structure thereof serves as a resistance to the wind from the outside, so that the wind is less likely to enter and the windbreak effect is high. Thus, when the vertical take-off and landing aircraft 10 takes off and lands near the coupling portion, it is possible to further stabilize the posture of the vertical take-off and landing aircraft 10 at the time of take-off and landing.

In addition, since the radially outer portion of the fan-shaped take-off and landing area 2 is opened, it is possible to alleviate the limitation on the size of the airframe of the vertical take-off and landing aircraft 10 that takes off and lands in the take-off and landing area 2. Furthermore, since the radially outer portion of the fan-shaped take-off and landing area 2 is opened, it is easy to enter the take-off and landing place 1, and in a case where the vertical take-off and landing aircraft 10 is used to carry a cargo, it is easy to take in and out the cargo, and it is easy to use the airport 100 for the vertical take-off and landing aircraft for other applications (for example, emergency evacuation spot) in a time section in which the airport 100 for the vertical take-off and landing aircraft is not used to take off and land the vertical take-off and landing aircraft 10, and thus it is possible to improve the land use efficiency.

In addition, in the take-off and landing place surrounded by walls on four sides, it is necessary to provide an entrance such as a door for entering the inside of the take-off and landing place on the wall, but the airport 100 for a vertical take-off and landing aircraft in the present embodiment does not need to provide such an entrance and can suppress the cost.

In addition, at least one area of the remaining areas excluding the area located on the windward side of the reference axis CL among the three or more take-off and landing areas 2 is preferably used for take-off and landing of the vertical take-off and landing aircraft 10. As a result, even if the wind exceeding the windbreak wall 3 enters the take-off and landing area from the windward side, the wind is discharged from the opened portion. That is, the secondary flow and the vortex generated when the wind exceeding the windbreak wall 3 hits other walls are less likely to be generated, and it is possible to stabilize the posture of the vertical take-off and landing aircraft at the time of take-off and landing.

Furthermore, it is preferable that a plurality of remaining areas excluding an area located on the windward side of the reference axis CL among the three or more take-off and landing areas 2 is used for take-off and landing of the vertical take-off and landing aircraft. As a result, since the plurality of areas are used for take-off and landing of the vertical take-off and landing aircraft, it is possible to improve the use efficiency of the airport 100 for a vertical take-off and landing aircraft.

In addition, it is preferable that an area located most leeward among the three or more take-off and landing areas 2 is used for take-off and landing of the vertical take-off and landing aircraft 10. Since the take-off and landing area 2 located most leeward has a wide low wind speed area, it is possible to perform more stable take-off and landing, and it is possible to set a route 6 of the vertical take-off and landing aircraft 10 to be wider than an interval between the two adjacent windbreak walls 3.

In addition, the three or more windbreak walls 3 may be four windbreak walls 3a to 3d, the three or more take-off and landing areas 2 may be four take-off and landing areas 2a to 2d, and the remaining areas (the take-off and landing areas 2a to 2c in FIG. 1) excluding the area located on the windward side of the reference axis CL (the take-off and landing area 2d in FIG. 1) among the four take-off and landing areas 2a to 2d or the area located most leeward (the take-off and landing area 2b in FIG. 1) among the four take-off and landing areas 2a to 2d may be used for take-off and landing of the vertical take-off and landing aircraft 10.

FIG. 3 is an analysis diagram obtained by analyzing the distribution of the wind speed in the III-III cross section of FIG. 1. In FIG. 3, similarly to FIG. 1, the air flow 5 blows from the take-off and landing area 2d to the take-off and landing area 2b (from the right side to the left side in the drawing), and it is indicated that the wind speed is high in a dark black area and the wind speed is low in a light black area.

As illustrated in FIG. 3, the wind speed is the lowest in the take-off and landing area 2b located leeward among the four or more take-off and landing areas 2a to 2d. In addition, since the leeward side of the take-off and landing area 2b is opened, a secondary flow or a vortex generated when the air flow 5 exceeding the windbreak wall 3 hits another wall is less likely to be generated, and it is possible to stabilize the posture of the vertical take-off and landing aircraft at the time of take-off and landing.

Furthermore, since a light black low wind speed area 5a is higher than the windbreak wall 3c in the take-off and landing area 2b, it is not necessary to set the route 6 of the vertical take-off and landing aircraft 10 to be lower than the windbreak wall 3c, and it is possible to approach the take-off and landing area 2b while maintaining a high altitude. That is, it is possible to set the route 6 of the vertical take-off and landing aircraft 10 to be wide.

It can be confirmed from FIG. 3 that the downwash 51, which is an air flow toward the take-off and landing surface of the take-off and landing area 2b, is formed by the rotor 1a of the vertical take-off and landing aircraft 10. Furthermore, it can be confirmed that the downwash 51 becomes the ground air flow 52 flowing along the take-off and landing surface when reaching the take-off and landing surface of the take-off and landing area 2b, and the ground air flow 52 flowing toward the windbreak wall 3 becomes an ascending air flow 53 ascending along the side surface of the windbreak wall 3.

In the airport 100 for a vertical take-off and landing aircraft according to the present embodiment, the slit 4 that causes two adjacent take-off and landing areas 2 to communicate with each other is provided at the lower portion of one windbreak wall 3 that partitions the two adjacent take-off and landing areas 2 among the three or more windbreak walls 3. Therefore, the ground air flow 52 flowing along the take-off and landing surface of the take-off and landing area 2b passes through the slit 4c and flows through the adjacent take-off and landing areas 2a and 2c, and thus the ascending air flow 53 ascending along the side surface of the windbreak wall 3 becomes weak, and a circulating flow from the upper end of the windbreak wall 3 toward the rotor 1a cannot be confirmed. As a result, it is possible to suppress the vertical take-off and landing aircraft 10 from losing control due to a phenomenon called a vortex ring state and becoming a stall state, and it is possible to provide the safe and highly reliable airport 100 for a vertical take-off and landing aircraft.

Furthermore, as illustrated in FIG. 2, the slit 4 preferably has a symmetrical shape with respect to the center plane CS of one windbreak wall 3c that partitions two adjacent take-off and landing areas 2b and 2c, and the shape of the slit 4c is preferably, for example, an inverted V-shape. As a result, the direction of the ground air flow 52 flowing along the take-off and landing surface of the take-off and landing area 2b is changed in the slit 4c, and the wind force of the ground air flow 52 reaching the adjacent take-off and landing area 2c can be weakened. As a result, even if the vertical take-off and landing aircraft 10 takes off and lands in the take-off and landing area 2b, the influence on the adjacent take-off and landing area 2c is suppressed, the vertical take-off and landing aircraft 10 can take off and land at the same time in the adjacent take-off and landing area 2c, and it is possible to improve the efficiency of the airport 100 for a vertical take-off and landing aircraft.

On the other hand, since the take-off and landing place 1 is partitioned by the windbreak wall 3 in the take-off and landing area 2 (take-off and landing areas 2a to 2d in the present embodiment), the influence of the downwash by the rotor 1a of the vertical take-off and landing aircraft 10 is suppressed in the take-off and landing area 2 adjacent to the take-off and landing area 2 where the vertical take-off and landing aircraft 10 takes off and lands. Therefore, a plurality of (three in the present embodiment) vertical take-off and landing aircraft 10 can simultaneously take off and land, and it is possible to improve the efficiency of the airport 100 for a vertical take-off and landing aircraft.

FIG. 4 is an analysis diagram obtained by analyzing the distribution of the wind speed in view of arrows IV-IV in FIG. 3. In FIG. 4, similarly to FIG. 1, the air flow 5 blows from the take-off and landing area 2d to the take-off and landing area 2b (from the top to the bottom in the drawing), and it is indicated that the wind speed is high in a dark black area and the wind speed is low in a light black area, similar to FIG. 3.

As illustrated in FIG. 4, it can be confirmed that the air flow 5 is blocked by the windbreak walls 3a and 3b, and the wind speed on the leeward side of the windbreak walls 3a and 3b is reduced.

In particular, the take-off and landing area 2b located most leeward among the four or more take-off and landing areas 2a to 2d is sufficiently windproof, and not only particularly safe take-off and landing is possible, but also the leeward side is released, so that it is easy to take off and land the vertical take-off and landing aircraft 10 larger than the take-off and landing areas 2c and 2a.

Furthermore, since the width of the low wind speed area 5a in the left-right direction in FIG. 4 is wider than an interval W between the end portions of the windbreak walls 3b and 3c on the leeward side, it is possible to set the route 6 of the vertical take-off and landing aircraft 10 to be wider than the interval W between the end portions of the windbreak walls 3b and 3c on the leeward side.

On the other hand, it can be confirmed that the low wind speed area 5a is also formed in the take-off and landing areas 2a and 2c on the leeward side with respect to the windbreak walls 3a and 3b. Thus, the vertical take-off and landing aircraft 10 can take off and land not only in the take-off and landing area 2b located most leeward among the four take-off and landing areas 2a to 2d, but also in the plurality of remaining take-off and landing areas 2a and 2c excluding the take-off and landing area 2b located most leeward among the four take-off and landing areas 2a to 2d and the take-off and landing area 2d located on the windward side of the reference axis CL. As a result, since a plurality of vertical take-off and landing aircrafts 10 can simultaneously take off and land, it is possible to improve the use efficiency of the airport 100 for a vertical take-off and landing aircraft. In a case where the vertical take-off and landing aircraft 10 takes off and lands in the plurality of remaining take-off and landing areas 2a and 2c excluding the take-off and landing area 2b located most leeward among the four take-off and landing areas 2a to 2d and the take-off and landing area 2d located on the windward side of the reference axis CL, as illustrated in FIG. 4, it is preferable to cause the vertical take-off and landing aircraft 10 to take off and land in an area closer to the reference axis CL that has become the low wind speed area 5a.

It is preferable that a columnar body to which each of three or more windbreak walls 3a, 3b, 3c, . . . is coupled is provided at the position of the reference axis CL. As a result, it is possible to easily process the windbreak wall 3 and to improve the strength of the windbreak wall 3.

Second Embodiment

FIG. 5 is a schematic plan view of an airport 200 for a vertical take-off and landing aircraft according to a second embodiment of the present invention. The airport 200 for a vertical take-off and landing aircraft according to the present embodiment is different from the airport 100 for a vertical take-off and landing aircraft according to the first embodiment in that there are three windbreak walls 23 that extend radially around the reference axis CL, and the take-off and landing place 21 is partitioned into three take-off and landing areas 22 by the windbreak walls 23a to 23c. In FIG. 5, the shape of the take-off and landing place 21 is set as a hexagon, but may be set as another shape, for example, a circle or a triangle.

Effects

In the airport 200 for a vertical take-off and landing aircraft in the present embodiment, since the number of the windbreak walls 23 is three, it is possible to suppress the cost. In addition, since the intersection angle of the adjacent windbreak walls 23 is wide, the vertical take-off and landing aircraft 10 larger than that of the first embodiment can take off and land.

Third Embodiment

FIG. 6 is a schematic plan view of an airport 300 for a vertical take-off and landing aircraft according to a third embodiment of the present invention. The airport 300 for a vertical take-off and landing aircraft according to the present embodiment is different from the airport 100 for a vertical take-off and landing aircraft according to the first embodiment in that there are eight windbreak walls 33 that extend radially around the reference axis CL, and a take-off and landing place 31 is partitioned into eight take-off and landing areas 32a to 32h by the windbreak walls 33a to 33h. In FIG. 6, the shape of the take-off and landing place 31 is an octagon, but may be another shape, for example, a circle.

Effects

In the airport 300 for a vertical take-off and landing aircraft in the present embodiment, there are eight take-off and landing areas 32, and in the case of FIG. 6, the remaining take-off and landing areas 32b to 32f excluding the take-off and landing areas 32a, 32g, and 32h located on the windward side of the reference axis CL can be used for take-off and landing of the vertical take-off and landing aircraft 10. As a result, since five vertical take-off and landing aircrafts 10 can simultaneously take off and land, it is possible to improve the use efficiency of the airport 300 for a vertical take-off and landing aircraft.

The present invention is not limited to the above embodiments, and various modification examples may be provided. For example, the above-described embodiments are described in detail in order to explain the present invention in an easy-to-understand manner, and the above embodiments are not necessarily limited to a case including all the described configurations. Further, some components in one embodiment can be replaced with the components in another embodiment, and the configuration of another embodiment can be added to the configuration of one embodiment. Regarding some components in the embodiments, other components can be added, deleted, and replaced.

For example, in the embodiments described above, the number of the windbreak walls 3 is any of 3, 4, and 8 in the airport, but the number of the windbreak walls 3 only needs to be 3 or more, and is more preferably any of 3 to 8.

Furthermore, in each of the above embodiments, the case where one area located in the wind direction is specified among all the take-off and landing areas included in the airport has been described. However, for example, in a case where wind having the same wind direction flows through a plurality of take-off and landing areas, an area excluding the plurality of take-off and landing areas may be used for take-off and landing of the aircraft 10. Furthermore, in a case where wind blows from a plurality of directions with respect to the airport and a plurality of take-off and landing areas are located on the windward side, an area excluding the plurality of take-off and landing areas located on the windward side may be used for take-off and landing of the aircraft 10.

In addition, in each of the above embodiments, in order to make the conditions for the wind in each take-off and landing area the same, distances (lengths of the windbreak walls) at which the windbreak walls extend radially from the reference axis CL are made equal, but the distances may be made different. Similarly, the distance between two adjacent windbreak walls in the same airport may be different, or the height of each windbreak wall may be different.

What is claimed is:

1. An airport for a vertical take-off and landing aircraft, the airport comprising:
    three or more windbreak walls that extend radially about a reference axis;
    three or more take-off and landing areas for the vertical take-off and landing aircraft, which are partitioned by two adjacent windbreak walls among the three or more windbreak walls; and
    wherein a slit that causes two adjacent take-off and landing areas to communicate with each other is provided at a lower portion of one windbreak wall that partitions the two adjacent take-off and landing areas among the three or more windbreak walls.

2. The airport for a vertical take-off and landing aircraft according to claim 1, wherein at least one area of remaining areas excluding an area located on a windward side of the reference axis among the three or more take-off and landing areas is used for take-off and landing of the vertical take-off and landing aircraft.

3. The airport for a vertical take-off and landing aircraft according to claim 1, wherein a plurality of remaining areas excluding an area located on a windward side of the reference axis among the three or more take-off and landing areas are used for take-off and landing of the vertical take-off and landing aircraft.

4. The airport for a vertical take-off and landing aircraft according to claim 1, wherein an area located most leeward among the three or more take-off and landing areas is used for take-off and landing of the vertical take-off and landing aircraft.

5. The airport for a vertical take-off and landing aircraft according to claim 1,
    wherein the three or more windbreak walls are four windbreak walls,
    wherein the three or more take-off and landing areas are four take-off and landing areas, and
    wherein, among the four take-off and landing areas, an area different from an area located on a windward side of the reference axis, or an area located most leeward among the four take-off and landing areas is used for take-off and landing of the vertical take-off and landing aircraft.

6. The airport for a vertical take-off and landing aircraft according to claim 1, wherein a columnar body to which each of the three or more windbreak walls is coupled is provided at a position of the reference axis.

7. The airport for a vertical take-off and landing aircraft according to claim 1, wherein the slit has a symmetrical shape with respect to a center plane of one windbreak wall that partitions the two adjacent take-off and landing areas.

8. The airport for a vertical take-off and landing aircraft according to claim 7, wherein a shape of the slit in a cross section perpendicular to the center plane of the one windbreak wall is an inverted V-shape.

9. The airport for a vertical take-off and landing aircraft according to claim 1, wherein a number of the three or more windbreak walls is any of 3 to 8.

10. The airport for a vertical take-off and landing aircraft according to claim 1, wherein at least one area of remaining areas excluding an area located most windward among the three or more take-off and landing areas is used for take-off and landing of the vertical take-off and landing aircraft.

* * * * *